Jan. 14, 1947.  R. S. HALL  2,414,149
NUT SPLITTING DEVICE
Filed Aug. 3, 1945

Inventor:
Robert S. Hall
By Lee J. Gary
Attorney

Patented Jan. 14, 1947

2,414,149

UNITED STATES PATENT OFFICE 2,414,149

NUT SPLITTING DEVICE

Robert S. Hall, Chicago, Ill.

Application August 3, 1945, Serial No. 608,695

8 Claims. (Cl. 30—189)

This invention relates to a nut splitting device and has for an object the provision of a device of this kind which is simple in operation, inexpensive to manufacture, and which will not readily get out of order.

As is well known to mechanics and others engaged in the repair of vehicles, machinery and the like, it is often very difficult to remove nuts from their bolts when same are corroded or rusted due to extended exposure to the elements. It has heretofore been the practice of mechanics and others to use a hammer and chisel for removing nuts from bolts when same cannot be removed by means of a wrench. The use of a hammer and chisel for the removal of nuts is objectionable as this practice often results in injury to the parts of the machine held together by bolts and nuts.

This invention contemplates the provision of a nut splitting device which is formed to facilitate the splitting of nuts positioned in confined places and not readily accessible for removal by other means heretofore known in this art.

This invention further contemplates the provision of a nut splitting device provided with adapter sleeves of various sizes for demountable positioning therein to accommodate nuts of different diameters.

This invention further contemplates the provision of a nut splitting device in which the longitudinal axis of the device is disposed at an angle with respect to the axis of the nut to be received and split in order to adapt the tool for use in splitting nuts which are not readily accessible by means of a standard tool of this type.

This invention embodies other novel features, details of construction and arrangement of parts which are hereinafter set forth in the specification and claims and illustrated in the accompanying drawing wherein:

Figure 1:
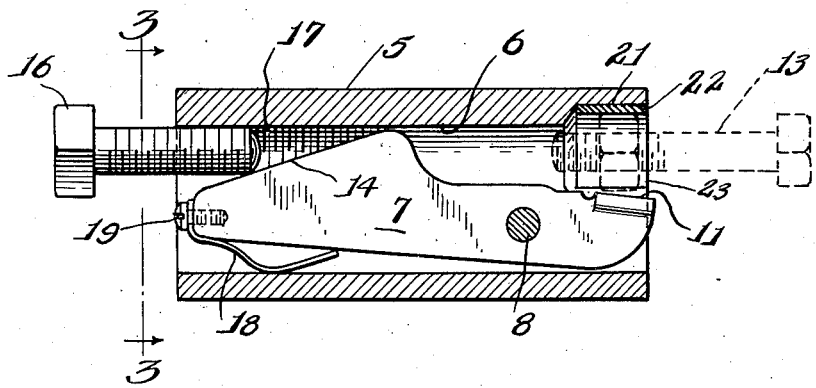
Fig. 1 is a longitudinal sectional view showing a nut splitting device embodying features of this invention.
Figure 2:
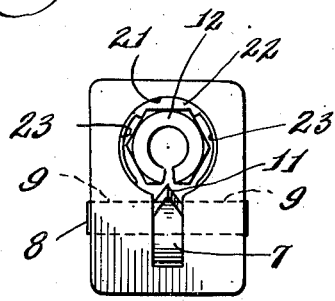
Fig. 2 is an end view of same.
Figure 3:
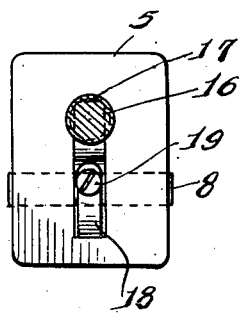
Fig. 3 is a sectional view taken along the line 3—3 of Fig. 1.

Referring now to the drawing for a better understanding of this invention, and more particularly to Figs. 1 to 3 therein, the nut splitting device is shown as comprising a casing 5 which is formed with a longitudinal extending opening 6 to receive a lever 7. The lever 7 is journaled for pivotal movement on a pin 8 having its ends press-fitted in apertures 9 provided in the side walls of the casing 5.

The forward end of the lever 7 is formed with a knife-edge 11 for engagement with a flat side of a nut 12 to be split and removed from a bolt 13. The opposite end of the lever 7 is provided with an inclined surface 14 for engagement by the forward end of a cap screw 16 for moving the knife-edge 11 into cutting engagement with the nut 12 to be removed from the bolt. The casing 5 is preferably formed with a threaded opening 17 extending longitudinally thereof to receive the cap screw 16 in order that the cap screw may serve as a wedge acting between the top wall of the casing and the inclined surface 14 to thus provide a greatly increased cutting force against the nut to be split.

A strip of flat spring metal 18 is interposed between the lower edge of the lever 7 and the bottom wall of the casing 5 to return the lever 7 to its normal position when the cap screw 16 is threaded outwardly from the casing 5. The spring 18 may be secured against displacement by means of a screw 19 threaded into the end of the lever 7.

In order to adapt the nut splitting device for use with nuts of different diameters, the forward end of the casing 5 is preferably formed with a circular recess 21 to receive a set of adapters 22. The adapters 22 may be formed in different sizes to correspond to the diameters of the nuts to be split by the device, and each adapter is provided with resilient side portions 23 for frictional clamping engagement against the wall of the recess 21. By means of the spring portions 23, the adapters 22 may readily be removed and replaced by adapters of different sizes.

Figure 4:
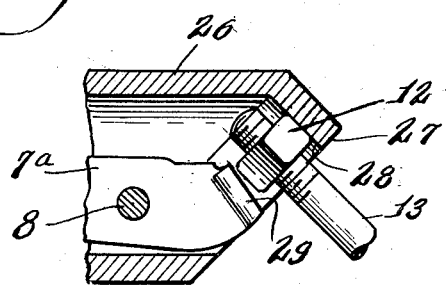
Fig. 4 is a fragmentary longitudinal sectional view showing a modified form of this invention in which the nut receiving recess is disposed at an angle with respect to the longitudinal axis of the device.

Fig. 4 illustrates a modified form of this invention in which the casing 26 is provided with a face 27 disposed at an angle with respect to the longitudinal axis of the casing to adapt the device for use in removing nuts which are not readily accessible for removal by the use of the nut splitting device heretofore described. In this form of the invention, the axis of the nut receiving recess 28 is also disposed at an angle to the longitudinal axis of the casing 26, and the angular position of the cutting edge 29 of the lever 7a is changed to conform to the change in position of the axis of the recess 28. The form of device illustrated in Fig. 4 otherwise embodies the same construction and arrangement of parts as the device heretofore described in connection with Figs. 1 to 3.

In the use of a device of this type, an adapter 22 of suitable size is first inserted in the recess 22 provided in the forward end of the casing 5. The device is then positioned to engage a nut 12, in the manner illustrated in Figs. 1, 2 and 4. By threading the cap screw 16 into the casing 5, it will be noted that the forward end of the cap screw serves as a wedge between the top wall of the casing and the inclined surface 14 and thus acts to pivot the cutting edge of the lever 7 into cutting engagement with the nut 12. It will also be observed that only a slight force is required to turn the cap screw 16 in order to split a nut due to the improved wedge and leverage action of the device.

While this invention has been shown in but two forms, it is obvious to those skilled in the art that it is not so limited but is susceptible of various changes and modifications without departing from the spirit and scope of the claimed invention.

I claim as my invention:

1. A nut splitting device comprising an elongated casing having a longitudinally extending opening formed therein, said casing having a socket formed in one end thereof to receive a nut to be split, a lever pivotally mounted intermediate its ends within the opening formed in said casing, a knife-edge formed on the outer end of said lever, and wedge means coacting between said casing and the inner end of said lever for moving said knife-edge into cutting engagement with a nut in said socket.

2. A nut splitting device comprising an elongated casing having a longitudinally extending opening formed therein, said casing having a socket formed in one end thereof to receive a nut to be split, a lever pivotally mounted intermediate its ends within the opening formed in said casing, a knife-edge formed on the outer end of said lever, and a screw threaded into said casing for engagement with the inner end of said lever for pivotally moving said knife-edge into cutting engagement with a nut in said socket.

3. A nut splitting device comprising an elongated casing having a longitudinally extending opening formed therein, said casing having a socket formed in one end thereof to receive a nut to be split, a lever pivotally mounted intermediate its ends within the opening formed in said casing, a knife-edge formed on the outer end of said lever, an inclined surface formed on the inner end of said lever, and a screw threaded into said casing for wedge engagement between the casing and said inclined surface on the lever for pivotally moving said knife-edge into cutting engagement with a nut in said socket.

4. A nut splitting device comprising an elongated casing having a longitudinally extending opening formed therein, said casing having a socket formed in one end thereof to receive a nut to be split, a lever pivotally mounted intermediate its ends within the opening formed in said casing, a knife-edge formed on the outer end of said lever, an inclined surface formed on the inner end of said lever, a screw threaded into said casing for wedge engagement between the casing and said inclined surface on the lever for pivotally moving said knife-edge into cutting engagement with a nut in said socket, and spring means for maintaining the inclined surface of said lever in operative engagement with said screw.

5. A nut splitting device comprising an elongated casing having a longitudinally extending opening formed therein, said casing having a socket formed in one end thereof to receive a nut to be split, a lever pivotally mounted intermediate its ends within the opening formed in said casing, a knife-edge formed on the outer end of said lever, an inclined surface formed on the inner end of said lever, a screw threaded into said casing for wedge engagement between the casing and said inclined surface on the lever for pivotally moving said knife-edge into cutting engagement with a nut in said socket, spring means for maintaining the inclined surface of said lever in operative engagement with said screw, and an adapter for demountable engagement in said casing socket.

6. A nut splitting device comprising an elongated casing having a longitudinally extending opening formed therein, said casing having a socket formed in one end thereof to receive a nut to be split, a lever pivotally mounted intermediate its ends within the opening formed in said casing, a knife-edge formed on the outer end of said lever, an inclined surface formed on the inner end of said lever, a screw threaded into said casing for wedge engagement between the casing and said inclined surface on the lever for pivotally moving said knife-edge into cutting engagement with a nut in said socket, spring means for maintaining the inclined surface of said lever in operative engagement with said screw, and an adapter for demountable engagement in said casing socket, said adapter being in the form of a split ring having resilient side portions for frictional engagement with the wall of said socket.

7. A nut splitting device according to claim 6 in which, the nut receiving face of the casing is disposed at right angles to the longitudinal axis of the casing.

8. A nut splitting device according to claim 6 in which, the axis of the nut receiving socket is disposed at an angle to the longitudinal axis of the casing.

ROBERT S. HALL.